United States Patent
Hall

(10) Patent No.: US 12,267,309 B2
(45) Date of Patent: Apr. 1, 2025

(54) SYSTEM AND METHOD PROVIDING SECURE ACCESS TO INTERNET OF THINGS DEVICES

(71) Applicant: AT&T Intellectual Property I, L.P., Atlanta, GA (US)

(72) Inventor: Robert J. Hall, Berkeley Heights, NJ (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 358 days.

(21) Appl. No.: 17/834,403

(22) Filed: Jun. 7, 2022

(65) Prior Publication Data
US 2023/0396596 A1 Dec. 7, 2023

(51) Int. Cl.
*H04L 9/40* (2022.01)
*G16Y 30/10* (2020.01)
*H04L 67/141* (2022.01)

(52) U.S. Cl.
CPC ...... *H04L 63/0442* (2013.01); *H04L 63/0435* (2013.01); *H04L 63/107* (2013.01); *H04L 67/141* (2013.01); *G16Y 30/10* (2020.01)

(58) Field of Classification Search
CPC ............. H04L 63/0442; H04L 63/0435; H04L 63/107; H04L 67/141; G16Y 30/10
See application file for complete search history.

(56) References Cited

U.S. PATENT DOCUMENTS

| | | | |
|---|---|---|---|
| 10,027,624 B1* | 7/2018 | Salour | H04L 61/5007 |
| 11,509,764 B1* | 11/2022 | Salour | H04M 3/54 |
| 2001/0015965 A1* | 8/2001 | Preston | G01S 5/0027 |
| | | | 370/475 |
| 2005/0021738 A1* | 1/2005 | Goeller | H04L 69/161 |
| | | | 709/224 |

(Continued)

OTHER PUBLICATIONS

Bousbaa, Fatima Zohra et al. "GeoUAVs: A New Geocast Routing Protocol for Fleet of UAVs." Computer communications 149 (2020): 259-269. Web. (Year: 2020).*

(Continued)

*Primary Examiner* — Techane Gergiso
(74) *Attorney, Agent, or Firm* — Guntin & Gust, PLC; Andrew Gust

(57) ABSTRACT

Aspects of the subject disclosure may include, for example, a device, including: a processing system including a processor; and a memory that stores executable instructions that, when executed by the processing system, facilitate performance of operations of allocating a port for receiving a request to access a resource of a second device, wherein the second device has a non-routable network address, wherein the device is on a first network, wherein the second device is on a third network, and wherein the first network and the third network are communicatively coupled by the second network; opening a second connection to a network element on the second network responsive to receiving a first connection; sending a first message to the network element to create a meeting with the resource; and sending (Continued)

a Geocast message requesting that the second device create a third connection that enables access to the resource, wherein the Geocast message identifies a geographic area in which the second device is physically located. Other embodiments are disclosed.

20 Claims, 8 Drawing Sheets

(56) References Cited

U.S. PATENT DOCUMENTS

| | | | | |
|---|---|---|---|---|
| 2006/0010252 | A1* | 1/2006 | Miltonberger | H04L 67/131 |
| | | | | 709/225 |
| 2007/0263571 | A1* | 11/2007 | Hermann | H04L 12/18 |
| | | | | 370/338 |
| 2012/0108326 | A1* | 5/2012 | Hall | A63F 13/71 |
| | | | | 463/29 |
| 2014/0149601 | A1* | 5/2014 | Carney | H04L 61/4511 |
| | | | | 709/238 |
| 2014/0195102 | A1* | 7/2014 | Nathanson | H04W 4/48 |
| | | | | 701/31.4 |
| 2014/0207835 | A1* | 7/2014 | Jellick | H04L 41/082 |
| | | | | 707/827 |
| 2015/0131499 | A1* | 5/2015 | Hall | H04L 45/00 |
| | | | | 370/310 |
| 2015/0134851 | A1* | 5/2015 | Relan | H04L 67/52 |
| | | | | 709/241 |
| 2016/0292696 | A1* | 10/2016 | Gong | G08G 5/0034 |
| 2019/0182155 | A1* | 6/2019 | Chang | H04L 45/24 |
| 2019/0373405 | A1* | 12/2019 | Jones | H04L 61/4511 |

OTHER PUBLICATIONS

Hall, Robert J., "The Geocast Air Operations Framework", 2019, 20 pages.

* cited by examiner

Component X has unroutable IP address due to NAT or firewall.
Component Y has a public IP address.
* X can originate a connection outward to Y
* Y cannot originate a connection to X A fundamental problem in IoT:
* Neither X nor Y can originate a connection to the other, because both have unroutable IP addresses

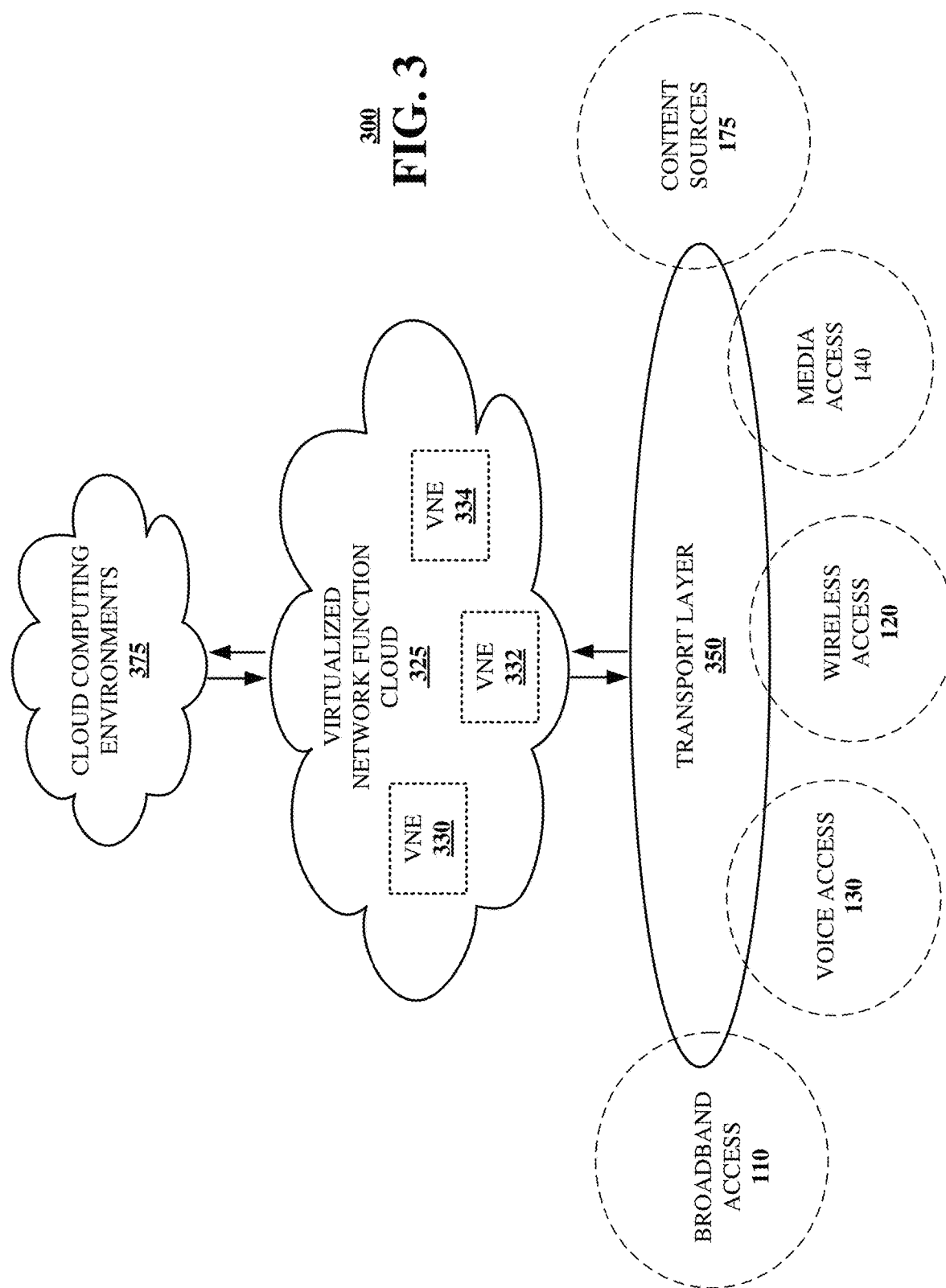

600

SYSTEM AND METHOD PROVIDING SECURE ACCESS TO INTERNET OF THINGS DEVICES

FIELD OF THE DISCLOSURE

The subject disclosure relates to a system and method providing secure access to Internet of Things (IoT) devices.

BACKGROUND

IoT devices may initiate a transport control protocol (TCP) based service to provide data to other devices. However, IoT devices may not have routable addresses, and may also be mobile and may not be identifiable by their physical location.

BRIEF DESCRIPTION OF THE DRAWINGS

Reference will now be made to the accompanying drawings, which are not necessarily drawn to scale, and wherein:

FIG. 3 is a block diagram illustrating an example, non-limiting embodiment of a virtualized communication network in accordance with various aspects described herein.

DETAILED DESCRIPTION

Figure 1:
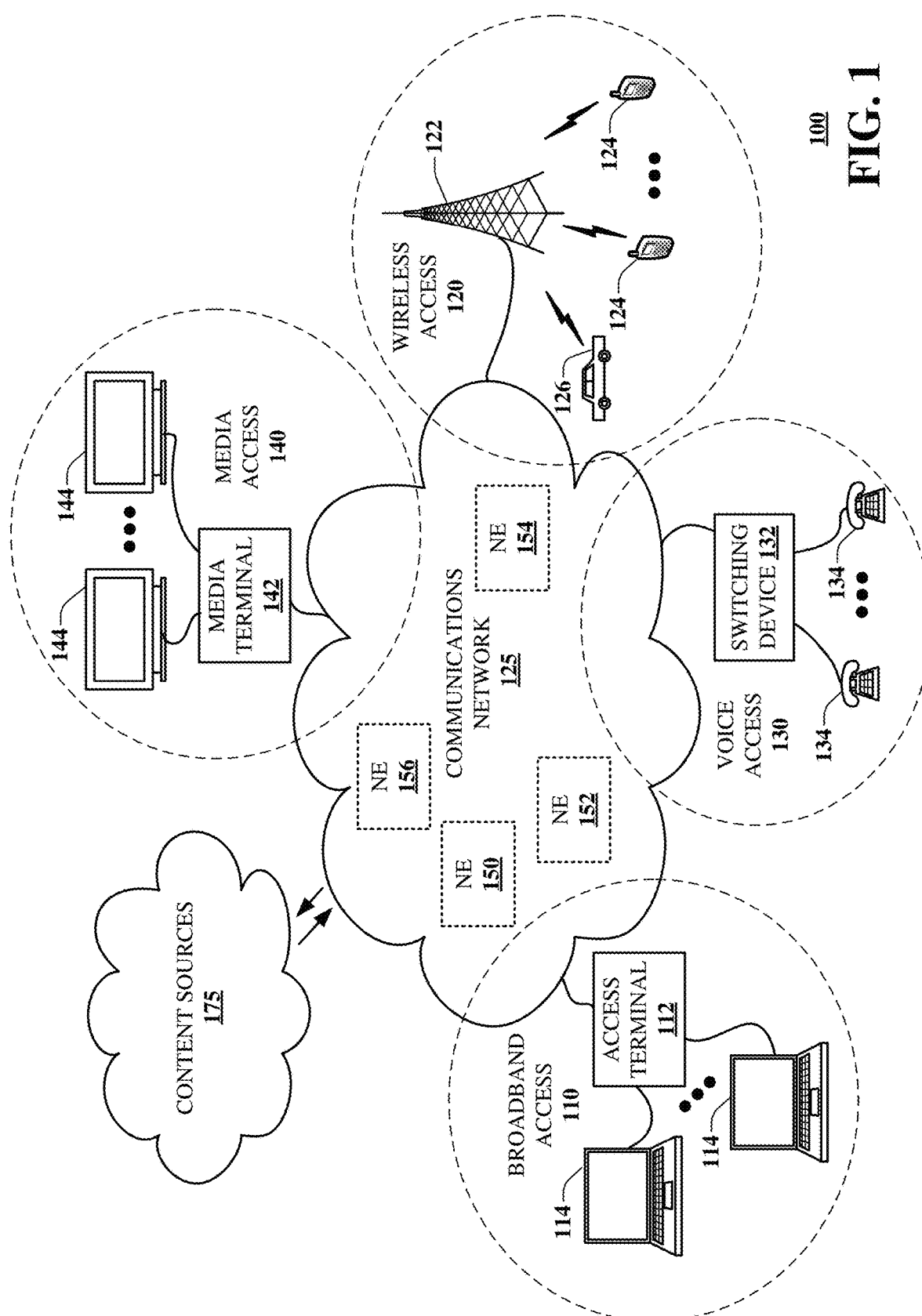
FIG. 1 is a block diagram illustrating an exemplary, non-limiting embodiment of a communications network in accordance with various aspects described herein.

The subject disclosure describes, among other things, illustrative embodiments for a system and method providing secure access to Internet of Things (IoT) devices, known as Geocast Wormholes. A Geocast Wormhole is a scalable technique implemented within the Geocast Air Operations Framework (GAOF) for enabling secure access to services resident on IoT devices. Obtaining secure access is challenging due to at least two significant issues. First, an initiation problem stems from IoT devices and the computers of operators wishing to access them are typically provided an unrouteable Internet address behind a Network Address Translator (NAT) by their service provider and such devices may also reside behind a firewall. In such configuration, there is no way for either device to initiate a connection to the other. Second, a designation problem stems from IoT devices owned and deployed by diverse stakeholders at widespread times are seldom given host names or other well-known identifiers. Therefore, a particular request has difficulty designating, at a network level, which IoT device, if any, is the proper one to satisfy the request.

Geocast Wormholes use Geocast messaging to solve both problems, securely conveying the necessary information to set up and concatenate secure connections using a rendezvous server as an intermediary point. Other embodiments are described in the subject disclosure.

One or more aspects of the subject disclosure include a device, including: a processing system including a processor; and a memory that stores executable instructions that, when executed by the processing system, facilitate performance of operations of allocating a port for receiving a request to access a resource of a second device, wherein the second device has a non-routable network address, wherein the device is on a first network, wherein the second device is on a third network, and wherein the first network and the third network are communicatively coupled by the second network; opening a second connection to a network element on the second network responsive to receiving a first connection; sending a first message to the network element to create a meeting with the resource; and sending a Geocast message requesting that the second device create a third connection that enables access to the resource, wherein the Geocast message identifies a geographic area in which the second device is physically located.

One or more aspects of the subject disclosure include a non-transitory, machine-readable medium, comprising executable instructions that, when executed by a processing system including a processor, facilitate performance of operations, including establishing a first connection with a first device on a first network; receiving a request from the first device to access a resource of a second device having a non-routable Internet Protocol (IP) address, wherein the processing system is on the first network, wherein the second device is on a third network isolated from a second network by a firewall, and wherein the first network and the third network are communicatively coupled by the second network; opening a second connection to a network element on the second network responsive to receiving the request; sending a first message to the network element requesting access the resource; and sending a Geocast message over the second connection requesting that the second device create a third connection, wherein the Geocast message identifies a geographic area in which the second device is physically located.

One or more aspects of the subject disclosure include a method of receiving, by a processing system including a processor, a request over a first connection with a first device on a first network to access a resource of a mobile device having a non-routable Internet Protocol (IP) address on a third network, wherein the first network is isolated from a second network by a first firewall, wherein the third network isolated from the second network by a second firewall, and wherein the first network and the third network are communicatively coupled by the second network; opening, by the processing system, a second connection to a network element on the second network responsive to receiving the request; sending, by the processing system, a first message to the network element requesting access the resource; and encrypting and sending, by the processing system, a Geocast message over the second connection identifying a geographic area in which the mobile device is physically located, wherein the network element forwards the Geocast message to the mobile device, wherein the mobile device decrypts the Geocast message and, responsive to the Geocast message, establishes a third connection to the network element, and wherein the first connection, the second connection and the third connection form a transmission control protocol stream between the mobile device and the first device.

Referring now to FIG. 1, a block diagram is shown illustrating an example, non-limiting embodiment of a system 100 in accordance with various aspects described herein. For example, system 100 can facilitate in whole or in part establishing connections with devices on a network; receiving a request from the first device to access a resources of devices having a non-routable addresses, opening connections through a firewall to a network element on another network, sending messages to the network element, and sending a Geocast message using Geocast implementation methods as known in the art to the network element requesting that a device having a non-routable address create a connection through another firewall to the network element, wherein the Geocast message identifies a geographic area in which the second device is physically located. See Hall, R. J., "The Geocast Air Operations Framework" in Proc. AUVSI XPONENTIAL (2019), which is incorporated by reference herein. In particular, a communications network 125 is presented for providing broadband access 110 to a plurality of data terminals 114 via access terminal 112, wireless access 120 to a plurality of mobile devices 124 and vehicle 126 via base station or access point 122, voice access 130 to a plurality of telephony devices 134, via switching device 132 and/or media access 140 to a plurality of audio/video display devices 144 via media terminal 142. In addition, communication network 125 is coupled to one or more content sources 175 of audio, video, graphics, text and/or other media. While broadband access 110, wireless access 120, voice access 130 and media access 140 are shown separately, one or more of these forms of access can be combined to provide multiple access services to a single client device (e.g., mobile devices 124 can receive media content via media terminal 142, data terminal 114 can be provided voice access via switching device 132, and so on).

The communications network 125 includes a plurality of network elements (NE) 150, 152, 154, 156, etc. for facilitating the broadband access 110, wireless access 120, voice access 130, media access 140 and/or the distribution of content from content sources 175. The communications network 125 can include a circuit switched or packet switched network, a voice over Internet protocol (VoIP) network, Internet protocol (IP) network, a cable network, a passive or active optical network, a 4G, 5G, or higher generation wireless access network, WIMAX network, UltraWideband network, personal area network or other wireless access network, a broadcast satellite network and/or another communications network.

In various embodiments, communications protocols may be layered above an IP network. Transmission Control Protocol (TCP) is a standard Internet transport layer protocol defined and implemented within the Internet. TCP is the workhorse for almost all major higher-level functions, including email transport, file transfer, world wide web traffic, and most video transport. TCP enables the reliable transfer of information streams (long sequences of bytes) in a way that guarantees in-order delivery to the receiving computer. A TCP connection is established by having an initiating device (client) sending an open request to a receiving device, specifying a port number. For this operation to be possible, the receiving IP address must be a routable address from the initiating device. The initiating and receiving devices perform a handshake protocol to establish a session. This session consists of two streams: an input stream and an output stream. The initiating device (a.k.a., "client") output stream will be the receiving device (a.k.a., "host" or "server") input stream, and vice-versa. Each stream is a resource encapsulating a transfer of bytes; the client writes bytes to its output stream, and the bytes are delivered to the host's input stream in the order in which they were sent.

User Datagram Protocol (UDP) is another standard Internet transport protocol. However, in contrast with TCP, UDP does not guarantee all packets will arrive and does not guarantee that the bytes will arrive in an order that they were sent, or even that the bytes will arrive at all. The Internet supports UDP connections in a comparable way as with TCP connections, but the connections do not provide streams (which guarantee in-order delivery). Rather, UDP connections provide only the pathways for the individual packets to traverse from client to host and vice-versa.

In various embodiments, the access terminal 112 can include a digital subscriber line access multiplexer (DSLAM), cable modem termination system (CMTS), optical line terminal (OLT) and/or other access terminal. The data terminals 114 can include personal computers, laptop computers, netbook computers, tablets or other computing devices along with digital subscriber line (DSL) modems, data over coax service interface specification (DOCSIS) modems or other cable modems, a wireless modem such as a 4G, 5G, or higher generation modem, an optical modem and/or other access devices.

In various embodiments, the base station or access point 122 can include a 4G, 5G, or higher generation base station, an access point that operates via an 802.11 standard such as 802.11n, 802.11ac or other wireless access terminal. The mobile devices 124 can include mobile phones, e-readers, tablets, phablets, wireless modems, and/or other mobile computing devices.

In various embodiments, the switching device 132 can include a private branch exchange or central office switch, a media services gateway, VoIP gateway or other gateway device and/or other switching device. The telephony devices 134 can include traditional telephones (with or without a terminal adapter), VoIP telephones and/or other telephony devices.

In various embodiments, the media terminal 142 can include a cable head-end or other TV head-end, a satellite receiver, gateway or other media terminal 142. The display devices 144 can include televisions with or without a set top box, personal computers and/or other display devices.

In various embodiments, the content sources 175 include broadcast television and radio sources, video on demand platforms and streaming video and audio services platforms, one or more content data networks, data servers, web servers and other content servers, and/or other sources of media.

In various embodiments, the communications network 125 can include wired, optical and/or wireless links and the network elements 150, 152, 154, 156, etc. can include service switching points, signal transfer points, service control points, network gateways, media distribution hubs, servers, virtual machines, containers as in Kubernetes or Docker, firewalls, routers, edge devices, switches and other network nodes for routing and controlling communications traffic over wired, optical and wireless links as part of the Internet and other public networks as well as one or more private networks, for managing subscriber access, for billing and network management and for supporting other network functions.

The Internet of Things (IoT) connects all sorts of devices located in our real-world environment to each other and to the Internet. Such devices often have computational resources and typically manage one or more resources, such as cameras, sensors, and actuators that can exert effects on the environment. Examples include drones, mobile robots, autonomous vehicles, surveillance systems, person-worn biosensors, and kitchen appliances. Often, to gain use of or benefit from an IoT device's resources, one needs to access a network service running there from one's (remote) control interface (phone or laptop). For example, to see the video being captured from a drone, one needs to access the video stream over the network.

In a general situation, making such connections is challenging for a couple of reasons. First, IoT devices are typically given an unrouteable, class A private IPv4 address (e.g., 10.x.x.x net address) behind a Network Address Translator (NAT). The device can call out and receive a response, but there is no way for another computer to initiate a session to the IoT device from outside of the private network, because routers outside of the private network cannot route a packet to the device.

Figure 2A:
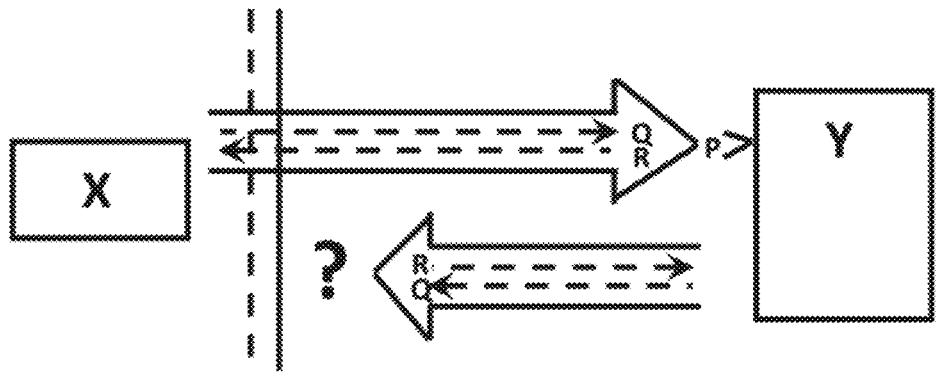
FIG. 2A is a block diagram illustrating an example of an initiation problem.

FIG. 2A is a block diagram illustrating an example of this so-called initiation problem. A mobile IoT device (labeled X on FIG. 2A) is typically connected to the Internet using a standard 4G/LTE or 5G cellular device; however, the IoT device could be connected via other wireless technologies such as Wi-Fi, satellite, or many others. Usually, the mobile IoT device receives an unrouteable IP address (typically, a 10.* or other unrouteable IP address) from the cellular system. This means that while the mobile IoT device can initiate network connections to public IP addresses on the Internet, such as host Y, the mobile IoT device is effectively invisible and unreachable from other devices on the Internet. As shown in FIG. 2A, X can establish a TCP session through port P on host Y, and create streams Q and R, but host Y cannot establish a TCP connection with mobile IoT device X. Only devices whose addresses are on the same unrouteable private subnet as the mobile IoT device X can create a TCP connection with X. Compounding this problem, it is typical for an operator's device to also have an unrouteable IP address, either due to also being a cellular device or being behind a firewall.

Figure 2B:
FIG. 2B is a block diagram illustrating an example of a designation problem.

FIG. 2B is a block diagram illustrating an example of this so-called designation problem. As shown in FIG. 2B, the device X labeled "Drone" can designate any IoT device, and not necessarily a drone specifically. The challenge is determining a destination address for a resource that a user wishes to access. For example, a person may be able to see a "drone above and slightly west of me," but will have no idea of the IP address, cell phone number, or any other network level identifier for the drone. This problem is ubiquitous and prevalent in the IoT space, since devices can appear in our environment and, even for a subset of devices that a user can actually control, the user may lack proper tools or documentation to learn network-level addressing info. Neither can the Drone initiate a connection with the "Operator" device Y, nor vice-versa. For example, the operator might be using residential broadband or a cellular connection for network access. In these situations, the operator is faced with both the designation and initiation problems: the unrouteable address of the drone is not known, and even if the address were known it would be impossible to route messages to it in order to open a connection.

Geocast Wormholes solve these problems using Geocast messaging. A Geocast Wormhole (hereinafter, "wormhole") is a special type of long-lived network connection between a client C and an IoT device D. The wormhole maps a network service port P on IoT device D to a service port Q on client C so that any device that can reach client C's port Q can effectively open a TCP or UDP connection to IoT device D's port P. Geocast wormholes can support either TCP connections or UDP connections. For definiteness and clarity, the following description will assume TCP, but the techniques are similar for UDP. For example, a video player on C's machine can contact the video service at P by accessing its own port Q and treating it exactly the same way as it would treat P. In that way, C can play video being sourced at D, with the video bytes transferring via the wormhole.

The key step in the solution is for the operator device O to send a geographically addressed message M to a region containing the mobile IoT device D. Message M, containing suitable cryptographic authentication, directs D to perform operations that, together with operations that operator device O performs, set up a wormhole transport configuration described in more detail below. Thus, the solution consists of (a) a messaging protocol, (b) the wormhole transport configuration that is set up between O and D, and (c) the security architecture that guarantees privacy and authentication.

When a mobile IoT device is Geocast enabled, the Geocast protocol allows a user to send a geographically addressed message purely by specifying a physical location (i.e., "send this message to that drone above me and slightly west") without knowledge of any network level identifiers. The Geocast system delivers the packet to all devices within the described address region. Assuming proper authentication within the packet, the receiving device can then act on the packet. Geocast messaging uses techniques that can penetrate arbitrary layers of NATs and firewalls to enable initiating a session where a standard TCP-open would fail. See Hall, R. J., "The Geocast Air Operations Framework" in Proc. AUVSI XPONENTIAL (2019), which is incorporated by reference herein.

Geographic addressing provides sending a message based on delivery in a physical space. In contrast, traditional logical addressing methods use destinations such as IP address, hardware MAC address, or cellular phone number, but do not deliver messages based on a physical location. Addressing a message to all devices currently (i.e., at the time of message sending) located within a particular volume of physical space is a natural conceptual operation in field applications, including real time tracking and situational awareness displays, geographically tagged information transfer protocols, drone flight tracking, and many others. Geographic addressing is technically challenging, because traditional communication networks of today are designed with only logical addressing in mind.

Figure 2C:
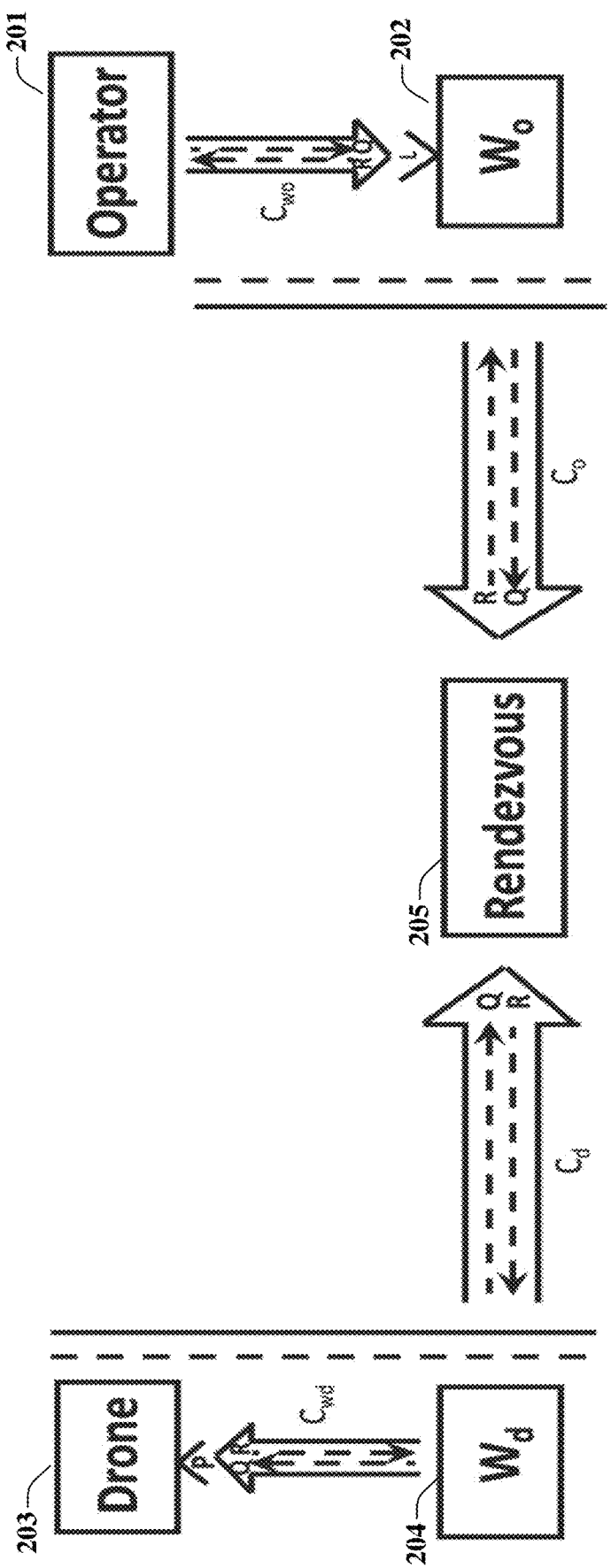
FIG. 2C is a block diagram illustrating an example, non-limiting embodiment of a wormhole system functioning within the communication network of FIG. 1 in accordance with various aspects described herein.

FIG. 2C is a block diagram illustrating an example, non-limiting embodiment of a wormhole system functioning within the communication network of FIG. 1 in accordance with various aspects described herein. As shown in FIG. 2C, system 200 comprises an operator device 201, a wormhole component 202 (labelled $W_o$), a mobile IoT device, drone 203, a wormhole component 204 (labelled $W_d$), and a rendezvous server 205. Wormhole component 202 is either resident on or on the same internal subnet as operator device 201. Likewise, wormhole component 204 is either resident on or on the same internal subnet as drone 203.

In an embodiment, rendezvous server 205 has a public Internet protocol address that serves as a common routable target address that the operator device 201 and the drone 203 can connect and establish a session through the wormhole transport configuration (or "wormhole" for short). In an embodiment, rendezvous server 205 may be implemented by a network element, such as network elements 150, 152, 154, 156 illustrated in FIG. 1.

The wormhole provides a transport connection opened by operator device 201 that allows bytes to flow between operator device 201 and port P of drone 203. This is not a network level setup, so the wormhole does not allow arbitrary packets to route between the two devices. The wormhole only provides streams into the particular service at port P of drone 203. This is a key security advantage over, for example, VPN based solutions that connect the subnet of drone 203 to the subnet of operator device 201 at the network level.

To set up the wormhole, four connections must be established. Wormhole component 202 must open a connection $C_o$ to rendezvous server 205. Wormhole component 204 must open a connection $C_d$ to rendezvous server 205 that is matched to the connection $C_o$ of wormhole component 202, which results in an ongoing transduction session at rendezvous server 205 for mapping bytes across the two connections. Operator device 201 must open connection $C_{wo}$ to port L on wormhole component 202; and wormhole component 204 must open a connection $C_{wd}$ to port P of drone 203. Wormhole component 202, wormhole component 204, and rendezvous server 205 all subsequently perform transduction sessions on the two connections incident to them. A transduction session takes every byte received from the incoming stream of one of the two connections incident on it and sends that byte out to the outgoing stream of the other connection. If any of the streams is closed or encounters an error, all other streams are closed immediately.

To use the wormhole, no alterations need to be made to the software of operator device 201 or drone 203; instead, operator device 201 must only address its open request to the local port L on wormhole component 202 instead of the unreachable port P of drone 203. Thus, most existing software that can use a normal transport connection can also use the wormhole means of access. As illustrated in FIG. 2C, once the wormhole is established, operator device 201 can access a stream for sending bytes to port P of drone 203 consisting of a concatenation of four connections: the Q stream of $C_{wo}$, the Q stream of $C_o$, the R stream of $C_d$, and the Q stream of $C_{wd}$. Drone 203 may use a stream for sending bytes to operator device 201 via the R stream of $C_{wd}$, the Q stream of $C_d$, the R stream of $C_o$, and the R stream of $C_{wo}$.

Figure 2D:
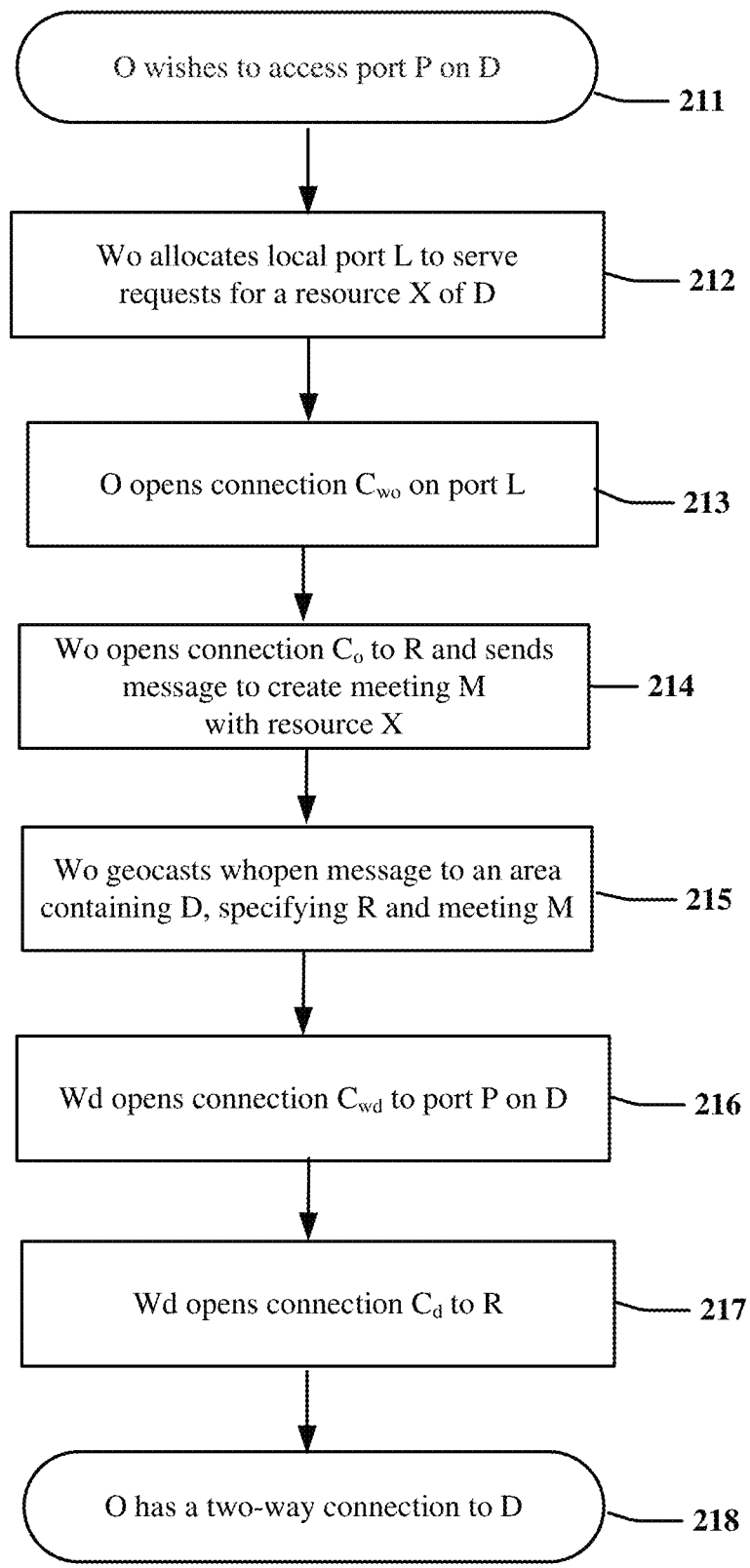
FIG. 2D depicts an illustrative embodiment of a method of creating a wormhole in accordance with various aspects described herein.

FIG. 2D depicts an illustrative embodiment of a method of creating a wormhole in accordance with various aspects described herein. As shown in FIG. 2D, method 210 begins in step 211 where a device O wishes to access a resource X provided by device D on port P. At configuration time, each device D creates a mapping from a set of resource identifiers to its own network service ports. This abstraction allows a consumer of a particular service to ask for such access by a well-known identifier (i.e., the resource ID), rather than having to know specific IP/port information that can, after all, differ between different devices D.

Next, in step 212, component Wo allocates a local service port L (i.e., on its localhost interface if Wo is running on the same computer as O's user interface, which is typical). Then, in step 213, O opens a connection to port L (again, likely over the localhost interface).

In turn, in step 214, component Wo opens a connection to a server. In an embodiment, the server spawns a separate instantiated network element R comprising an asymmetric key pair for R, $K_r$. Wo sends R a message directing R to create the meeting data structure M and providing credentials, an identifier to find D and the resource ID of X being requested. Wo may only know the location and an access credential (i.e., a key). Wo does not know the specific identifier of a particular D. The message to R requesting a meeting resource is processed as follows. First, a hash code of the body is calculated and appended to the body. Then, the body is encrypted using an asymmetric key pair $K_r$. The encryption half of $K_r$ may be known only to either to a single user (e.g., O) or to a class of users (e.g., all Os belonging to a particular organization). The decryption half of $K_r$ is known only to R, so only R can read the message body and validate its authenticity by checking the hash code. In this way, other than denial-of-service attacks, R cannot be attacked by someone without the encryption half. Once encrypted, only R can read the message body.

Next in step 215, Wo sends a Geocast message to an area in which device D is currently located. The Geocast message goes to *all* devices D within the specified Geocast region. Only the devices in that region having the correct key for the designated resource ID will respond. Wo can sort out a choice in the case where multiple Ds respond correctly, such as by showing the available different camera angles and asking for a selection, using them all, etc. The resource ID can be established by convention, e.g., a particular operator of drones D may establish that Resource #1 is for forward-video, Resource #2 is for downward-video, Resource #3 is for some other resource, etc. This cryptographically authentic message, directs D to open a connection to R and provides the information needed to convince R to attach D to the meeting M. The Geocast message is authenticated by an asymmetric key $K_i$ denoting a privilege to access resource X on D. Resource X could, for example, denote providing a forward-facing video camera data stream. Thus, anyone who can create a wormhole and possesses the encryption half of $K_i$ can access the resource X. Note that this does not require a particular R to be involved, so this privilege can be granted to users outside of O's organization or local subnet. Note that the set of entities allowed to access a particular R and the set of those allowed to access resource X are completely independent and may not intersect. The body of the Geocast message is created in a comparable way of the message created in step 214: a hash of the body plaintext is computed and appended to the body. Then the body is encrypted using the encryption half of $K_i$. Note that the body includes a field containing the Geocast ID of the intended target device D. This is necessary, since the Geocast message itself may be delivered to multiple devices all lying within the address region. Of course, it is straight-forward to generalize the wormhole configuration to allow multiple wormholes to be set up in response to a single Geocast message request. Such capability might be useful, for example, to access video streams from multiple drones flying in an area at the same time to get the best viewing angle.

In step 216, once the Geocast message is received by D (and hence Wd), D decrypts the body and checks the hash, then D directs component Wd to open a connection to port P on device D, where D maps the resource ID requested in the Geocast message to appropriate IP/port numbers on D.

Then in step 217, Wd opens a connection to R, requesting connection the meeting M, thereby completing the wormhole. Opening the $C_d$ connection is authenticated by a session key set up for the purpose by Wo and included in both the message of step 214 to R (so R can authenticate the 2n d meeting participant) and within the (encrypted body of the) Geocast message in step 215 (so that Wd knows what to use in its message to R). In this way, only Wo can join the meeting and no attacker can set up a fake wormhole connection to trick O.

Hence, in step 218, device O has a two-way connection to device D through port P to pass messages between the devices.

R provides essential functions of both serving as a mutable endpoint for both sides to use in setting up the connections, as well as transducing bytes between connections with components Wd and Wo. Meeting M denotes a persistent state object that is set up when component Wo contacts R. Meeting M records the necessary information governing the operation of the specific wormhole instance, including Geocast identifiers and resource identifiers, the open connections/streams, etc. Meeting M is torn down when the wormhole ends, either through one side finishing and closing a connection or when an error occurs. Meeting M also records nonces and other cryptographic information needed to authenticate the two endpoints on setup. Further, if R is a spawned instantiation, R may also disappear along with the connections at the end of the session.

While for purposes of simplicity of explanation, the respective processes are shown and described as a series of blocks in FIG. 2D, it is to be understood and appreciated that the claimed subject matter is not limited by the order of the blocks, as some blocks may occur in different orders and/or concurrently with other blocks from what is depicted and described herein. Moreover, not all illustrated blocks may be required to implement the methods described herein.

In an embodiment, a large-scale deployment across diverse stakeholders requires a robust key management system. Such a system would provide keys to authorized parties, plus the ability to expire or revoke keys. If such a scheme is needed in a particular deployment, one can be built using state of the practice tools.

In an embodiment, the bytes flowing within the wormhole connection can be secured by end-to-end symmetric key encryption. Wo generates a new AES key and includes it within the Geocast message of step 215. Wo and Wd use this session key in encrypting outgoing bytes and decrypting incoming bytes. For TCP streams, the bytes are encrypted using AES in a stream-cipher mode, with the two directions being two independent stream ciphers. Since UDP streams can lose packets entirely, this approach would not work; instead, the packets should each be encrypted using the session key in a suitable block mode. Thus, even though the bytes flow through the open Internet and through R, they cannot be eavesdropped and may only be read by the endpoints. Both TCP and UDP streams provide frame integrity checking to detect altered bytes. In the case of TCP, a garbled frame will be re-sent per the TCP protocol; whereas a garbled UDP frame will be discarded, since UDP does not guarantee delivery.

In an exemplary embodiment, a firefighter battling a wildfire needs to see video being captured by a drone flying above the fire area. He does not know who is operating the drone and does not know its network identifiers. By convention, a first responder drone provides its video stream at port 80 on its flight computer. The service is protected by a cryptographic key that is issued to all firefighters' devices. His device uses the above-described technique to create a Geocast wormhole from his device to the drone's flight computer's port 80 service. His device uses its normal video display tool to securely access the TCP-based video stream at a local port assigned on the firefighter's device by the wormhole software. This example is obviously applicable in other use cases, such as military operators (or plant or base security teams) operating in an area with drone support, or news producers covering an event in real time using pooled drone support for safety.

In another exemplary embodiment, law enforcement or other authorities observe an autonomous vehicle (car, truck, drone, or mobile robot) moving in a way that threatens human lives or an incursion into an unauthorized area. The autonomous vehicle supports an Authorized Emergency Control (AEC) service on port 2200, by which an authorized operator can take control of the vehicle and guide it to a safe deactivation. Obviously, such a service would be protected by cryptographic authentication limiting it to appropriate authorities. In this case, the officer's device opens a wormhole connecting one of its own ports to port 2200 of the vehicle and uses a client to access the AEC stream and safely deactivate the vehicle. The deactivation may involve complex instruction sequences such as exiting a freeway and finding a safe parking area, etc.

In another exemplary embodiment, sensors installed in remote areas may operate autonomously for extended periods out of range of network connections. During these times, the sensors log their measurements as time sequence data. The sensors provide access to the logged data via a service running locally on Port 8080. Examples include remote weather sensors, motion detectors and thermal sensors used in border security, and soil chemistry sensors. Users can then visit the area at intervals, either in person, via drone, or via autonomous vehicle. Such users may not be the owners of the sensors and may only wish to access the data. The user devices can set up a wormhole to port 8080 on each sensor in a particular area of interest and, assuming proper cryptographic authorization, collect the data. This access need not grant administrative access to the device, which could be managed by another authorized party via a different wormhole.

In another exemplary embodiment, a mobile robot is used for many tasks. A well-known example is for bomb disposal. In this case, the mobile robot maneuvers close to the device and then a remote explosives teleoperator takes fine control of the robot's actuators to do whatever is necessary to deal with the situation. Note that this remote teleoperator is preferably an expert in explosive devices; another robot operator might be preferably involved in commanding the robot's maneuvering to reach the site of the operation. This remote actuation capability could be provided via a command interface service made available through a wormhole to authorized teleoperators. The video feed necessary to the teleoperator could be provided through a second wormhole dedicated to a first-person view video sourced from the robot. Note that the teleoperator need not be the same person as the administrator or overall operator of the robot. The three roles could be separated, and different credentials provided for each. Wormholes facilitate this role separation securely and in a scalable way.

In an embodiment, when at least one link in the network path is an LTE link, the measured throughput is between 2-12 Mbps, depending entirely on the native link throughput, i.e., the wormhole implementation does not reduce the throughput. When transporting video, the measured end-to-end latency (i.e., the time from action happening in front of camera to time the action is seen in the video image at the operator console) is between 1 and 2 seconds when the LTE link was at least 4 Mbps. If the link has poor signal and hence lower throughput, the latency builds up. No determination was made as to how much of the latency is due to transport and how much is due to video processing. When all links were at least Wi-Fi speeds, the measured throughput is between 15 and 30 Mbps, depending on which Wi-Fi system was in use. For a home Wi-Fi, where the reported download speed is 30 Mbps and the reported upload speed is 11 Mbps, the wormhole comes remarkably close to matching those speeds. Measurements over all-Gbps ethernet have not been evaluated to find the maximum throughput supported by the current wormhole implementation.

A security analysis for AES symmetric or RSA asymmetric key ciphers and hash keys unbreakable through brute force at key lengths chosen are presumed for the following evaluated scenarios:

No devices compromised. In this case, no D devices, O operators or R rendezvous servers are compromised, so any attack must come from somewhere else in the network. No attacker E can compromise R. E cannot trick R into setting up an unauthorized meeting, because E, lacking a valid $K_r$, and cannot create a valid message recognized by R in step 214. E cannot force the uncompromised O to initiate a bogus session. Finally, E cannot create a valid Geocast message in step 215 to trick D since E lacks a valid $K_i$. Further, E cannot initiate a connection to attack a port of D or O (or Wd or Wo), because of the NAT/firewalls around D and O, respectively. Thus, the Geocast Wormhole system is secure with respect to attacks by an external E.

Only R is compromised. If R is rooted, it can behave arbitrarily badly. Any OLD pair trying to use R normally could be made to fail. Note first that there is no information stored at R and therefore known to E that can allow E to break into either O/Wo or D/Wd. Furthermore, breaking one R will not allow breaking into another R, since R is deployed entirely independently. If R is spawned, then R will only last as long as the connection. The information stored within R to validate requests from O is not useful even for creating sessions on other Rs, even if the same Os use the other Rs, as one can store credential information asymmetrically, only allowing verifying authentication and not creating it. The more critical question is whether E can do anything worse than just break R entirely? In particular, can E perpetrate a "man-in-the-middle (MITM) attack"? A MITM could lead to either (1) E tricks O into connecting to a different endpoint than the intended D, thereby receiving tainted information possibly leading to disaster; or (2) E eavesdrops on (i.e., obtains the cleartext of) the content flowing between D and O, thereby violating privacy and possibly obtaining sensitive information that could be useful for future attacks. Both (1) and (2) are impossible, reasoning as follows. E does not have a valid $K_i$, since E only has access to the information on R, which does not include the key $K_i$ as that only resides with O and D. Thus, E cannot decrypt the Geocast message in step 215 that O sends to learn the necessary session key to use in encrypting/decrypting session content. Thus, even though E may be able to connect O to a phony D, that phony D has no way to appropriately decrypt bytes from O or encrypt bytes to send to O. O will immediately notice that the stream fails to decrypt properly, since checksums will not match, and will abandon the session. In case (2), the same reasoning shows that E cannot decrypt the bytes flowing between D and O, again because E cannot obtain a valid $K_i$ to find the session's content key contained within the Geocast of step 215.

Only D is compromised. If D is compromised, it can create phony content and act badly in its session with O. However, the attack stops there. (1) E cannot obtain a valid $K_r$ since that information is never contained in the Geocast message of step 215. Thus, E cannot create meetings that might be used to trick other Ds into disclosing content. Also, there is no information stored at a D that could enable a break-in to server R, or even to O or Wo through a wormhole session, assuming best practice host security. (2) E cannot gain access to, compromise, or impersonate other Ds. A D only knows the decryption-half of the asymmetric key $K_i$. Unless the RSA cipher is broken, simply knowing the decryption key is not enough to derive the encryption half, at least within RSA. Thus, if only the decryption halves of the $K_i$ keys are distributed to Ds, E cannot create its own malicious R server and generate the necessary encrypted Geocast message to trick an uncompromised D into yielding its content to E.

Only O is compromised. If E compromises an operator O, then E can gain access to all content for which that O has the keys. E can use all Rs for which that O has a key. However, (1) E cannot access other Rs (i.e., for which that O does not have a $K_r$ key) and E cannot access services within other Ds (for which that O does not have a $K_i$ key). Moreover, there is no information stored at an O that would allow a break-in at an R server or at a D, even though a (legitimately setup) wormhole. Thus, while compromise of an O gives E access to all the info O can access, it does not enable further break-ins.

Attack Spread. An important aspect of this design is that the attacker must commit a similar amount of effort to gain each new node or information source. That is, there is no single "Ft. Knox" of information that would enable a class break, where, once E gets Ft. Knox, E has easy access to all the rest of the system. The worst case is an O compromise which yields easy access to the information sources to which O had access. As long as best industry practices for minimal privilege are followed, so that no O has access to things O does not actually need, the compromise of a single O stops with those resources. For example, even if an O has keys to access video services on drones, O does not need to have the ability to remotely login to the drone, transfer files, or do other administrative operations, the keys for which can be reserved for different Os. Similarly, Os can be authorized to access only the video feed, and other Os can be authorized to access other sensor feeds, such as system telemetry, lidar, altimeter, etc.

It will be appreciated by those skilled in the art that even though the foregoing description refers to TCP Geocast Wormholes, i.e., Geocast Wormholes that create TCP connections, the essential inventive concepts can be used to create UDP Geocast Wormholes. This uses the well-known UDP Connection feature of standard internet protocol stack implementations. Basically, when O creates the rendezvous meeting, O does this by sending a UDP message to R that creates a UDP connection between R and Wo. (Wo receives the acknowledgement of and information for the newly created meeting M via a return UDP along the connection.) This enables UDP packets to be sent from R to Wo (and thence onward to O by relaying at Wo). So, for O to access a stream of UDP packets originating at D, the Geocast setup message (see step 215 of FIG. 2) directs Wd to relay UDP packets originating at a resource X within D onward to R, where they can be relayed from there onward via the reverse path of the UDP connection with Wo.

Naturally, security for UDP based messaging must be implemented in accord with the fact that some UDP packets may be lost or delivered out of order, whereas security for a TCP stream can depend on in-order reliable delivery. One skilled in the art will appreciate that, while this difference may lead to a difference in the security implementation (such as replacing stream-based encryption for TCP with per-packet encryption of UDP) the overall concepts are essentially similar and anticipated by the current inventive ideas.

Referring now to FIG. 3, a block diagram 300 is shown illustrating an example, non-limiting embodiment of a virtualized communication network in accordance with various aspects described herein. In particular a virtualized communication network is presented that can be used to implement some or all of the subsystems and functions of system 100, the subsystems and functions of system 200, and method 230 presented in FIGS. 1, 2A, 2B, 2C, and 3. For example, virtualized communication network 300 can facilitate in whole or in part establishing connections with devices on a network; receiving a request from the first device to access a resources of devices having a non-routable addresses, opening connections through a firewall to a network element on another network, sending messages to the network element, and sending a Geocast message over the connection to the network element requesting that a device having a non-routable address create a connection through another firewall to the network element, wherein the Geocast message identifies a geographic area in which the second device is physically located.

In particular, a cloud networking architecture is shown that leverages cloud technologies and supports rapid innovation and scalability via a transport layer 350, a virtualized network function cloud 325 and/or one or more cloud computing environments 375. In various embodiments, this cloud networking architecture is an open architecture that leverages application programming interfaces (APIs); reduces complexity from services and operations; supports more nimble business models; and rapidly and seamlessly scales to meet evolving customer requirements including traffic growth, diversity of traffic types, and diversity of performance and reliability expectations.

In contrast to traditional network elements—which are typically integrated to perform a single function, the virtualized communication network employs virtual network elements (VNEs) 330, 332, 334, etc. that perform some or all of the functions of network elements 150, 152, 154, 156, etc. For example, the network architecture can provide a substrate of networking capability, often called Network Function Virtualization Infrastructure (NFVI) or simply infrastructure that is capable of being directed with software and Software Defined Networking (SDN) protocols to perform a broad variety of network functions and services. This infrastructure can include several types of substrates. The most typical type of substrate being servers that support Network Function Virtualization (NFV), followed by packet forwarding capabilities based on generic computing resources, with specialized network technologies brought to bear when general-purpose processors or general-purpose integrated circuit devices offered by merchants (referred to herein as merchant silicon) are not appropriate. In this case, communication services can be implemented as cloud-centric workloads.

As an example, a traditional network element 150 (shown in FIG. 1), such as an edge router can be implemented via a VNE 330 composed of NFV software modules, merchant silicon, and associated controllers. The software can be written so that increasing workload consumes incremental resources from a common resource pool, and moreover so that it is elastic: so, the resources are only consumed when needed. In a similar fashion, other network elements such as other routers, switches, edge caches, and middle-boxes are instantiated from the common resource pool. Such sharing of infrastructure across a broad set of uses makes planning and growing infrastructure easier to manage.

In an embodiment, the transport layer 350 includes fiber, cable, wired and/or wireless transport elements, network elements and interfaces to provide broadband access 110, wireless access 120, voice access 130, media access 140 and/or access to content sources 175 for distribution of content to any or all of the access technologies. In particular, in some cases a network element needs to be positioned at a specific place, and this allows for less sharing of common infrastructure. Other times, the network elements have specific physical layer adapters that cannot be abstracted or virtualized and might require special DSP code and analog front ends (AFEs) that do not lend themselves to implementation as VNEs 330, 332 or 334. These network elements can be included in transport layer 350.

The virtualized network function cloud 325 interfaces with the transport layer 350 to provide the VNEs 330, 332, 334, etc. to provide specific NFVs. In particular, the virtualized network function cloud 325 leverages cloud operations, applications, and architectures to support networking workloads. The virtualized network elements 330, 332 and 334 can employ network function software that provides either a one-for-one mapping of traditional network element function or alternately some combination of network functions designed for cloud computing. For example, VNEs 330, 332 and 334 can include route reflectors, domain name system (DNS) servers, and dynamic host configuration protocol (DHCP) servers, system architecture evolution (SAE) and/or mobility management entity (MME) gateways, broadband network gateways, IP edge routers for IP-VPN, Ethernet and other services, load balancers, distributers and other network elements. Because these elements do not typically need to forward substantial amounts of traffic, their workload can be distributed across a number of servers—each of which adds a portion of the capability, and which creates an overall elastic function with higher availability than its former monolithic version. These virtual network elements 330, 332, 334, etc. can be instantiated and managed using an orchestration approach similar to those used in cloud compute services.

The cloud computing environments 375 can interface with the virtualized network function cloud 325 via APIs that expose functional capabilities of the VNEs 330, 332, 334, etc. to provide the flexible and expanded capabilities to the virtualized network function cloud 325. In particular, network workloads may have applications distributed across the virtualized network function cloud 325 and cloud computing environment 375 and in the commercial cloud or might simply orchestrate workloads supported entirely in NFV infrastructure from these third-party locations.

Figure 4:
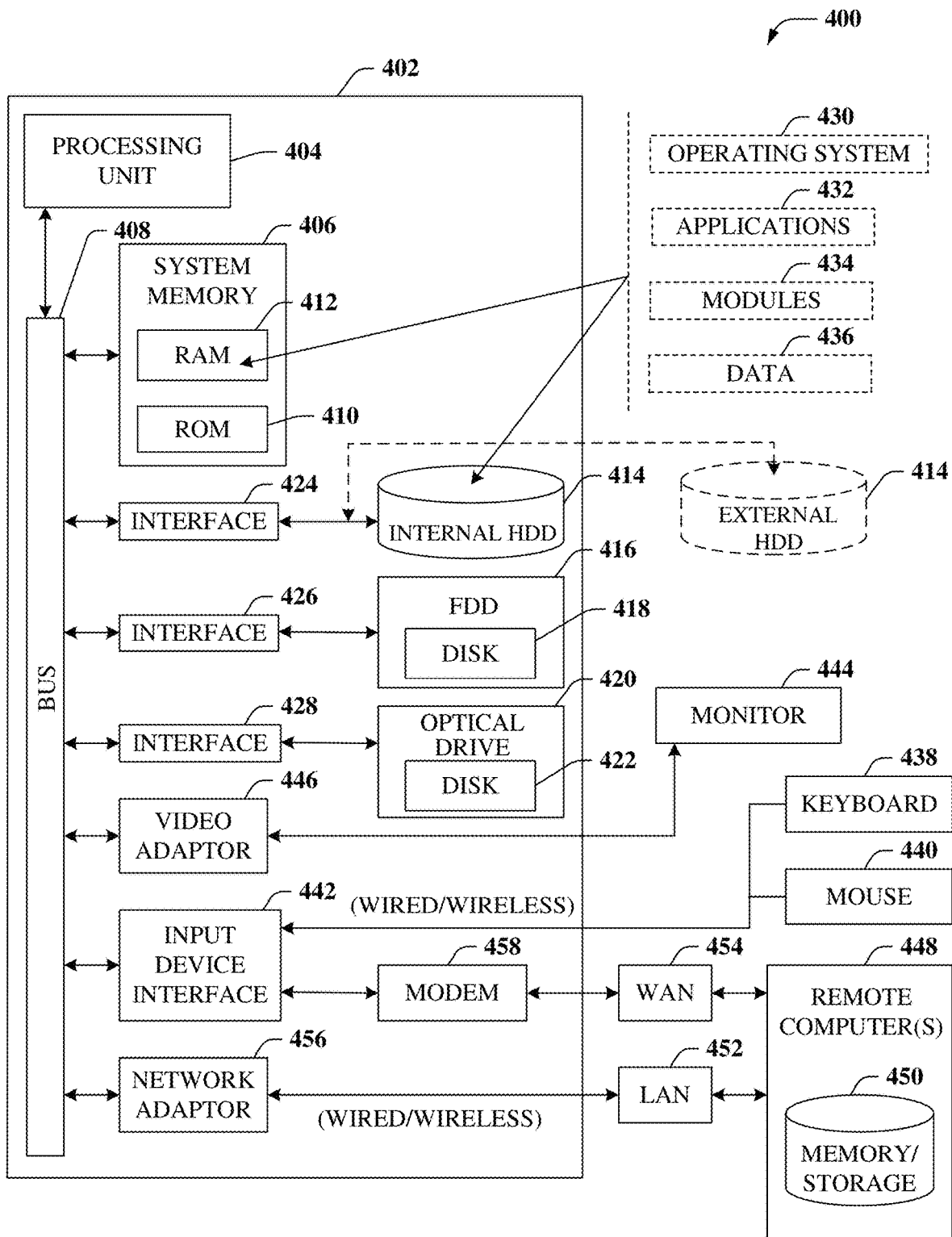
FIG. 4 is a block diagram of an example, non-limiting embodiment of a computing environment in accordance with various aspects described herein.

Turning now to FIG. 4, there is illustrated a block diagram of a computing environment in accordance with various aspects described herein. In order to provide additional context for various embodiments of the embodiments described herein, FIG. 4 and the following discussion are intended to provide a brief, general description of a suitable computing environment 400 in which the various embodiments of the subject disclosure can be implemented. In particular, computing environment 400 can be used in the implementation of network elements 150, 152, 154, 156, access terminal 112, base station or access point 122, switching device 132, media terminal 142, and/or VNEs 330, 332, 334, etc. Each of these devices can be implemented via computer-executable instructions that can run on one or more computers, and/or in combination with other program modules and/or as a combination of hardware and software. For example, computing environment 400 can facilitate in whole or in part establishing connections with devices on a network; receiving a request from the first device to access a resources of devices having a non-routable addresses, opening connections through a firewall to a network element on another network, sending messages to the network element, and sending a Geocast message over the connection to the network element requesting that a device having a non-routable address create a connection through another firewall to the network element, wherein the Geocast message identifies a geographic area in which the second device is physically located.

Generally, program modules comprise routines, programs, components, data structures, etc., that perform particular tasks or implement particular abstract data types. Moreover, those skilled in the art will appreciate that the methods can be practiced with other computer system configurations, comprising single-processor or multiprocessor computer systems, minicomputers, mainframe computers, as well as personal computers, hand-held computing devices, microprocessor-based or programmable consumer electronics, and the like, each of which can be operatively coupled to one or more associated devices.

As used herein, a processing circuit includes one or more processors as well as other application specific circuits such as an application specific integrated circuit, digital logic circuit, state machine, programmable gate array or other circuit that processes input signals or data and that produces output signals or data in response thereto. It should be noted that while any functions and features described herein in association with the operation of a processor could likewise be performed by a processing circuit.

The illustrated embodiments of the embodiments herein can be also practiced in distributed computing environments where certain tasks are performed by remote processing devices that are linked through a communications network. In a distributed computing environment, program modules can be located in both local and remote memory storage devices.

Computing devices typically comprise a variety of media, which can comprise computer-readable storage media and/or communications media, which two terms are used herein differently from one another as follows. Computer-readable storage media can be any available storage media that can be accessed by the computer and comprises both volatile and nonvolatile media, removable and non-removable media. By way of example, and not limitation, computer-readable storage media can be implemented in connection with any method or technology for storage of information such as computer-readable instructions, program modules, structured data or unstructured data.

Computer-readable storage media can comprise, but are not limited to, random access memory (RAM), read only memory (ROM), electrically erasable programmable read only memory (EEPROM), flash memory or other memory technology, compact disk read only memory (CD-ROM), digital versatile disk (DVD) or other optical disk storage, magnetic cassettes, magnetic tape, magnetic disk storage or other magnetic storage devices or other tangible and/or non-transitory media which can be used to store desired information. In this regard, the terms "tangible" or "non-transitory" herein as applied to storage, memory or computer-readable media, are to be understood to exclude only propagating transitory signals per se as modifiers and do not relinquish rights to all standard storage, memory or computer-readable media that are not only propagating transitory signals per se.

Computer-readable storage media can be accessed by one or more local or remote computing devices, e.g., via access requests, queries or other data retrieval protocols, for a variety of operations with respect to the information stored by the medium.

Communications media typically embody computer-readable instructions, data structures, program modules or other structured or unstructured data in a data signal such as a modulated data signal, e.g., a carrier wave or other transport mechanism, and comprises any information delivery or transport media. The term "modulated data signal" or signals refers to a signal that has one or more of its characteristics set or changed in such a manner as to encode information in one or more signals. By way of example, and not limitation, communication media comprise wired media, such as a wired network or direct-wired connection, and wireless media such as acoustic, RF, infrared and other wireless media.

With reference again to FIG. 4, the example environment can comprise a computer 402, the computer 402 comprising a processing unit 404, a system memory 406 and a system bus 408. The system bus 408 couples system components including, but not limited to, the system memory 406 to the processing unit 404. The processing unit 404 can be any of various commercially available processors. Dual microprocessors and other multiprocessor architectures can also be employed as the processing unit 404.

The system bus 408 can be any of several types of bus structure that can further interconnect to a memory bus (with or without a memory controller), a peripheral bus, and a local bus using any of a variety of commercially available bus architectures. The system memory 406 comprises ROM 410 and RAM 412. A basic input/output system (BIOS) can be stored in a non-volatile memory such as ROM, erasable programmable read only memory (EPROM), EEPROM, which BIOS contains the basic routines that help to transfer information between elements within the computer 402, such as during startup. The RAM 412 can also comprise a high-speed RAM such as static RAM for caching data.

The computer 402 further comprises an internal hard disk drive (HDD) 414 (e.g., EIDE, SATA), which internal HDD 414 can also be configured for external use in a suitable chassis (not shown), a magnetic floppy disk drive (FDD) 416, (e.g., to read from or write to a removable diskette 418) and an optical disk drive 420, (e.g., reading a CD-ROM disk 422 or, to read from or write to other high capacity optical media such as the DVD). The HDD 414, magnetic FDD 416 and optical disk drive 420 can be connected to the system bus 408 by a hard disk drive interface 424, a magnetic disk drive interface 426 and an optical drive interface 428, respectively. The hard disk drive interface 424 for external drive implementations comprises at least one or both of Universal Serial Bus (USB) and Institute of Electrical and Electronics Engineers (IEEE) 1394 interface technologies. Other external drive connection technologies are within contemplation of the embodiments described herein.

The drives and their associated computer-readable storage media provide nonvolatile storage of data, data structures, computer-executable instructions, and so forth. For the computer 402, the drives and storage media accommodate the storage of any data in a suitable digital format. Although the description of computer-readable storage media above refers to a hard disk drive (HDD), a removable magnetic diskette, and a removable optical media such as a CD or DVD, it should be appreciated by those skilled in the art that other types of storage media which are readable by a computer, such as zip drives, magnetic cassettes, flash memory cards, cartridges, and the like, can also be used in the example operating environment, and further, that any such storage media can contain computer-executable instructions for performing the methods described herein.

A number of program modules can be stored in the drives and RAM 412, comprising an operating system 430, one or more application programs 432, other program modules 434 and program data 436. All or portions of the operating system, applications, modules, and/or data can also be cached in the RAM 412. The systems and methods described herein can be implemented utilizing various commercially available operating systems or combinations of operating systems.

A user can enter commands and information into the computer 402 through one or more wired/wireless input devices, e.g., a keyboard 438 and a pointing device, such as a mouse 440. Other input devices (not shown) can comprise a microphone, an infrared (IR) remote control, a joystick, a game pad, a stylus pen, touch screen or the like. These and other input devices are often connected to the processing unit 404 through an input device interface 442 that can be coupled to the system bus 408, but can be connected by other interfaces, such as a parallel port, an IEEE 1394 serial port, a game port, a universal serial bus (USB) port, an IR interface, etc.

A monitor 444 or other type of display device can be also connected to the system bus 408 via an interface, such as a video adapter 446. It will also be appreciated that in alternative embodiments, a monitor 444 can also be any display device (e.g., another computer having a display, a smart phone, a tablet computer, etc.) for receiving display information associated with computer 402 via any communication means, including via the Internet and cloud-based networks. In addition to the monitor 444, a computer typically comprises other peripheral output devices (not shown), such as speakers, printers, etc.

The computer 402 can operate in a networked environment using logical connections via wired and/or wireless communications to one or more remote computers, such as a remote computer(s) 448. The remote computer(s) 448 can be a workstation, a server computer, a router, a personal computer, portable computer, microprocessor-based entertainment appliance, a peer device or other common network node, and typically comprises many or all of the elements described relative to the computer 402, although, for purposes of brevity, only a remote memory/storage device 450 is illustrated. The logical connections depicted comprise wired/wireless connectivity to a local area network (LAN) 452 and/or larger networks, e.g., a wide area network (WAN) 454. Such LAN and WAN networking environments are commonplace in offices and companies, and facilitate enterprise-wide computer networks, such as intranets, all of which can connect to a global communications network, e.g., the Internet.

When used in a LAN networking environment, the computer 402 can be connected to the LAN 452 through a wired and/or wireless communication network interface or adapter 456. The adapter 456 can facilitate wired or wireless communication to the LAN 452, which can also comprise a wireless AP disposed thereon for communicating with the adapter 456.

When used in a WAN networking environment, the computer 402 can comprise a modem 458 or can be connected to a communications server on the WAN 454 or has other means for establishing communications over the WAN 454, such as by way of the Internet. The modem 458, which can be internal or external and a wired or wireless device, can be connected to the system bus 408 via the input device interface 442. In a networked environment, program modules depicted relative to the computer 402 or portions thereof, can be stored in the remote memory/storage device 450. It will be appreciated that the network connections shown are example and other means of establishing a communications link between the computers can be used.

The computer 402 can be operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, restroom), and telephone. This can comprise Wireless Fidelity (Wi-Fi) and BLUETOOTH® wireless technologies. Thus, the communication can be a predefined structure as with a conventional network or simply an ad hoc communication between at least two devices.

Wi-Fi can allow connection to the Internet from a couch at home, a bed in a hotel room or a conference room at work, without wires. Wi-Fi is a wireless technology similar to that used in a cell phone that enables such devices, e.g., computers, to send and receive data indoors and out; anywhere within the range of a base station. Wi-Fi networks use radio technologies called IEEE 802.11 (a, b, g, n, ac, ag, etc.) to provide secure, reliable, fast wireless connectivity. A Wi-Fi network can be used to connect computers to each other, to the Internet, and to wired networks (which can use IEEE 802.3 or Ethernet). Wi-Fi networks operate in the unlicensed 2.4 and 5 GHz radio bands for example or with products that contain both bands (dual band), so the networks can provide real-world performance similar to the basic 10BaseT wired Ethernet networks used in many offices.

Figure 5:
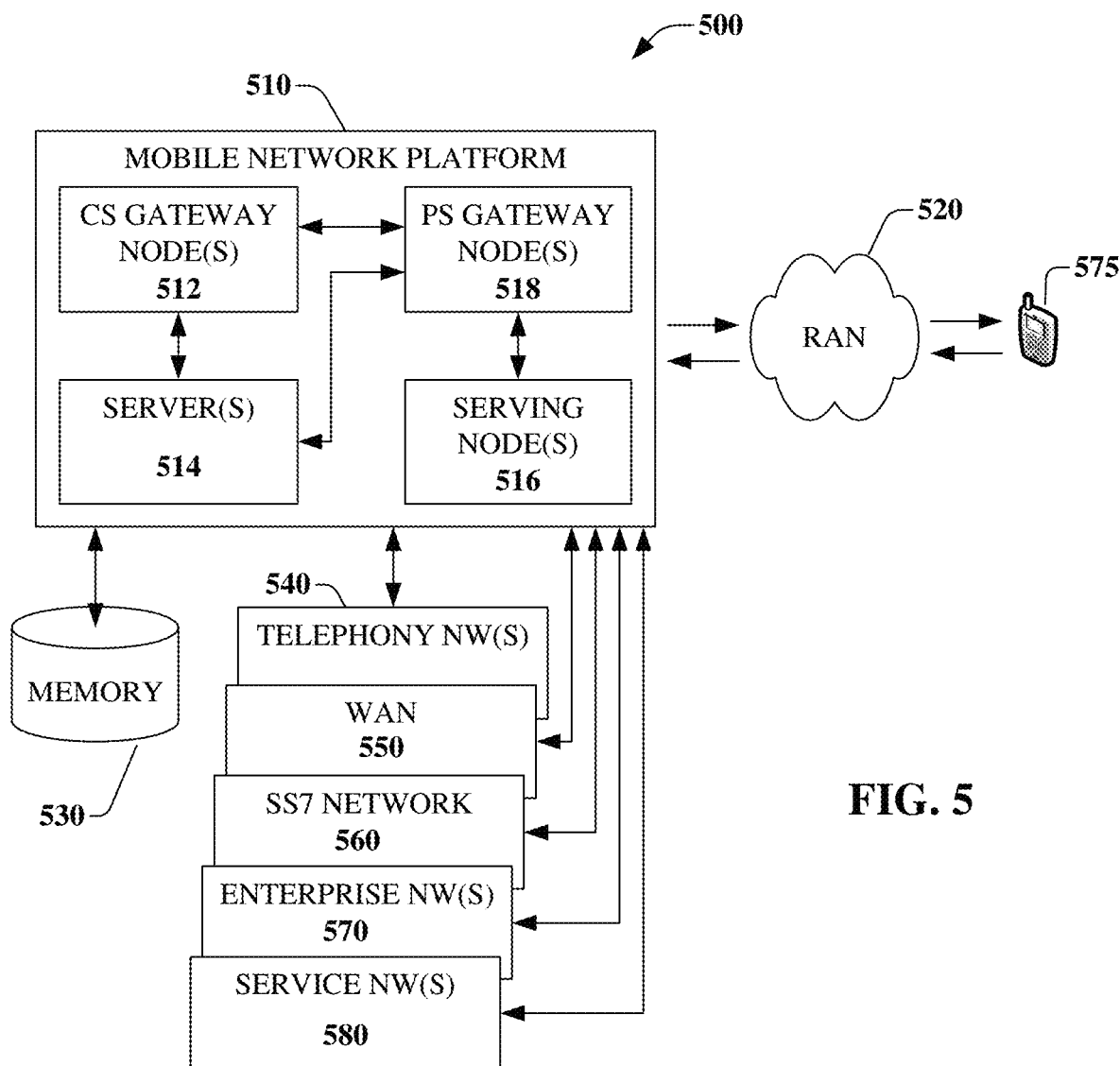
FIG. 5 is a block diagram of an example, non-limiting embodiment of a mobile network platform in accordance with various aspects described herein.

Turning now to FIG. 5, an embodiment 500 of a mobile network platform 510 is shown that is an example of network elements 150, 152, 154, 156, and/or VNEs 330, 332, 334, etc. For example, platform 510 can facilitate in whole or in part establishing connections with devices on a network; receiving a request from the first device to access a resources of devices having a non-routable addresses, opening connections through a firewall to a network element on another network, sending messages to the network element, and sending a Geocast message over the connection to the network element requesting that a device having a non-routable address create a connection through another firewall to the network element, wherein the Geocast message identifies a geographic area in which the second device is physically located.

In one or more embodiments, the mobile network platform 510 can generate and receive signals transmitted and received by base stations or access points such as base station or access point 122. Generally, mobile network platform 510 can comprise components, e.g., nodes, gateways, interfaces, servers, or disparate platforms, which facilitate both packet-switched (PS) (e.g., internet protocol (IP), frame relay, asynchronous transfer mode (ATM)) and circuit-switched (CS) traffic (e.g., voice and data), as well as control generation for networked wireless telecommunication. As a non-limiting example, mobile network platform 510 can be included in telecommunications carrier networks and can be considered carrier-side components as discussed elsewhere herein. Mobile network platform 510 comprises CS gateway node(s) 512 which can interface CS traffic received from legacy networks like telephony network(s) 540 (e.g., public switched telephone network (PSTN), or public land mobile network (PLMN)) or a signaling system #7 (SS7) network 560. CS gateway node(s) 512 can authorize and authenticate traffic (e.g., voice) arising from such networks. Additionally, CS gateway node(s) 512 can access mobility, or roaming, data generated through SS7 network 560; for instance, mobility data stored in a visited location register (VLR), which can reside in memory 530. Moreover, CS gateway node(s) 512 interfaces CS-based traffic and signaling and PS gateway node(s) 518. As an example, in a 3GPP UMTS network, CS gateway node(s) 512 can be realized at least in part in gateway GPRS support node(s) (GGSN). It should be appreciated that functionality and specific operation of CS gateway node(s) 512, PS gateway node(s) 518, and serving node(s) 516, is provided and dictated by radio technology(ies) utilized by mobile network platform 510 for telecommunication over a radio access network 520 with other devices, such as a radiotelephone 575.

In addition to receiving and processing CS-switched traffic and signaling, PS gateway node(s) 518 can authorize and authenticate PS-based data sessions with served mobile devices. Data sessions can comprise traffic, or content(s), exchanged with networks external to the mobile network platform 510, like wide area network(s) (WANs) 550, enterprise network(s) 570, and service network(s) 580, which can be embodied in local area network(s) (LANs), can also be interfaced with mobile network platform 510 through PS gateway node(s) 518. It is to be noted that WANs 550 and enterprise network(s) 570 can embody, at least in part, a service network(s) like IP multimedia subsystem (IMS). Based on radio technology layer(s) available in technology resource(s) or radio access network 520, PS gateway node(s) 518 can generate packet data protocol contexts when a data session is established; other data structures that facilitate routing of packetized data also can be generated. To that end, in an aspect, PS gateway node(s) 518 can comprise a tunnel interface (e.g., tunnel termination gateway (TTG) in 3GPP UMTS network(s) (not shown)) which can facilitate packetized communication with disparate wireless network(s), such as Wi-Fi networks.

In embodiment 500, mobile network platform 510 also comprises serving node(s) 516 that, based upon available radio technology layer(s) within technology resource(s) in the radio access network 520, convey the various packetized flows of data streams received through PS gateway node(s) 518. It is to be noted that for technology resource(s) that rely primarily on CS communication, server node(s) can deliver traffic without reliance on PS gateway node(s) 518; for example, server node(s) can embody at least in part a mobile switching center. As an example, in a 3GPP UMTS network, serving node(s) 516 can be embodied in serving GPRS support node(s) (SGSN).

For radio technologies that exploit packetized communication, server(s) 514 in mobile network platform 510 can execute numerous applications that can generate multiple disparate packetized data streams or flows, and manage (e.g., schedule, queue, format . . . ) such flows. Such application(s) can comprise add-on features to standard services (for example, provisioning, billing, customer support . . . ) provided by mobile network platform 510. Data streams (e.g., content(s) that are part of a voice call or data session) can be conveyed to PS gateway node(s) 518 for authorization/authentication and initiation of a data session, and to serving node(s) 516 for communication thereafter. In addition to application server, server(s) 514 can comprise utility server(s), a utility server can comprise a provisioning server, an operations and maintenance server, a security server that can implement at least in part a certificate authority and firewalls as well as other security mechanisms, and the like. In an aspect, security server(s) secure communication served through mobile network platform 510 to ensure network's operation and data integrity in addition to authorization and authentication procedures that CS gateway node(s) 512 and PS gateway node(s) 518 can enact. Moreover, provisioning server(s) can provision services from external network(s) like networks operated by a disparate service provider; for instance, WAN 550 or Global Positioning System (GPS) network(s) (not shown). Provisioning server(s) can also provision coverage through networks associated to mobile network platform 510 (e.g., deployed and operated by the same service provider), such as the distributed antennas networks shown in FIG. 1(*s*) that enhance wireless service coverage by providing more network coverage.

It is to be noted that server(s) 514 can comprise one or more processors configured to confer at least in part the functionality of mobile network platform 510. To that end, the one or more processors can execute code instructions stored in memory 530, for example. It should be appreciated that server(s) 514 can comprise a content manager, which operates in substantially the same manner as described hereinbefore.

In example embodiment 500, memory 530 can store information related to operation of mobile network platform 510. Other operational information can comprise provisioning information of mobile devices served through mobile network platform 510, subscriber databases; application intelligence, pricing schemes, e.g., promotional rates, flat-rate programs, couponing campaigns; technical specification(s) consistent with telecommunication protocols for operation of disparate radio, or wireless, technology layers; and so forth. Memory 530 can also store information from at least one of telephony network(s) 540, WAN 550, SS7 network 560, or enterprise network(s) 570. In an aspect, memory 530 can be, for example, accessed as part of a data store component or as a remotely connected memory store.

In order to provide a context for the various aspects of the disclosed subject matter, FIG. 5, and the following discussion, are intended to provide a brief, general description of a suitable environment in which the various aspects of the disclosed subject matter can be implemented. While the subject matter has been described above in the general context of computer-executable instructions of a computer program that runs on a computer and/or computers, those skilled in the art will recognize that the disclosed subject matter also can be implemented in combination with other program modules. Generally, program modules comprise routines, programs, components, data structures, etc. that perform particular tasks and/or implement particular abstract data types.

Figure 6:
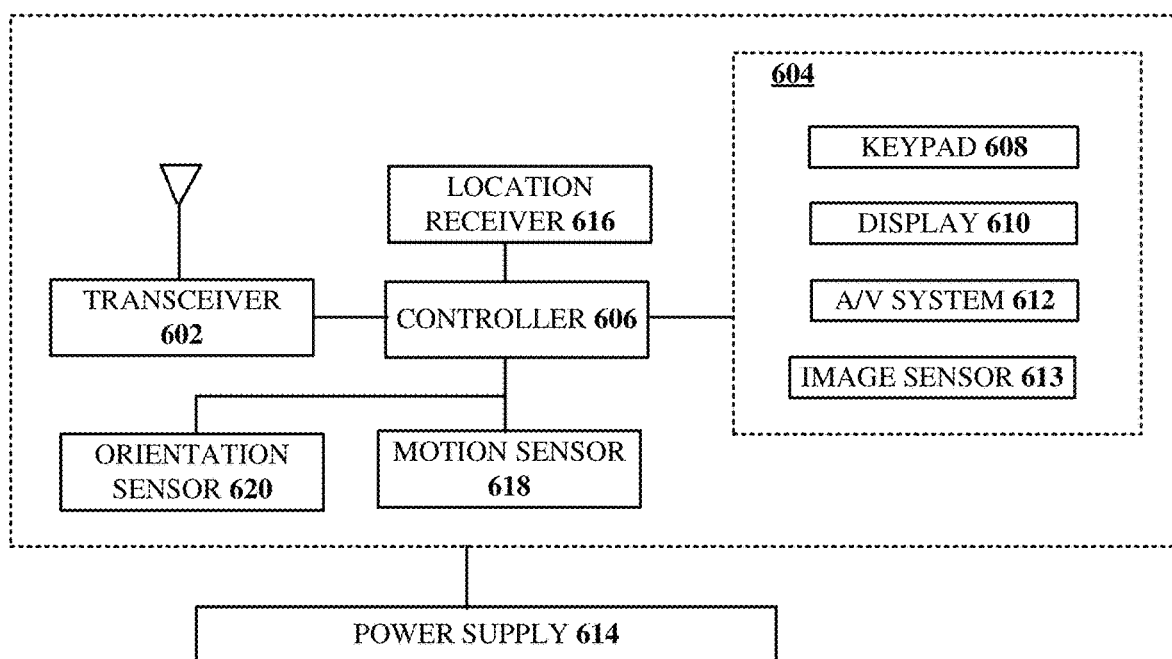
FIG. 6 is a block diagram of an example, non-limiting embodiment of a communication device in accordance with various aspects described herein.

Turning now to FIG. 6, an illustrative embodiment of a communication device 600 is shown. The communication device 600 can serve as an illustrative embodiment of devices such as data terminals 114, mobile devices 124, vehicle 126, display devices 144 or other client devices for communication via either communications network 125. For example, computing device 600 can facilitate in whole or in part establishing connections with devices on a network; receiving a request from the first device to access a resources of devices having a non-routable addresses, opening connections through a firewall to a network element on another network, sending messages to the network element, and sending a Geocast message over the connection to the network element requesting that a device having a non-routable address create a connection through another firewall to the network element, wherein the Geocast message identifies a geographic area in which the second device is physically located.

The communication device 600 can comprise a wireline and/or wireless transceiver 602 (herein transceiver 602), a user interface (UI) 604, a power supply 614, a location receiver 616, a motion sensor 618, an orientation sensor 620, and a controller 606 for managing operations thereof. The transceiver 602 can support short-range or long-range wireless access technologies such as Bluetooth®, ZigBee®, Wi-Fi, DECT, or cellular communication technologies, just to mention a few (Bluetooth® and ZigBee® are trademarks registered by the Bluetooth® Special Interest Group and the ZigBee® Alliance, respectively). Cellular technologies can include, for example, CDMA-1X, UMTS/HSDPA, GSM/GPRS, TDMA/EDGE, EV/DO, WiMAX, SDR, LTE, as well as other next generation wireless communication technologies as they arise. The transceiver 602 can also be adapted to support circuit-switched wireline access technologies (such as PSTN), packet-switched wireline access technologies (such as TCP/IP, VoIP, etc.), and combinations thereof.

The UI 604 can include a depressible or touch-sensitive keypad 608 with a navigation mechanism such as a roller ball, a joystick, a mouse, or a navigation disk for manipulating operations of the communication device 600. The keypad 608 can be an integral part of a housing assembly of the communication device 600 or an independent device operably coupled thereto by a tethered wireline interface (such as a USB cable) or a wireless interface supporting for example Bluetooth®. The keypad 608 can represent a numeric keypad commonly used by phones, and/or a QWERTY keypad with alphanumeric keys. The UI 604 can further include a display 610 such as monochrome or color LCD (Liquid Crystal Display), OLED (Organic Light Emitting Diode) or other suitable display technology for conveying images to an end user of the communication device 600. In an embodiment where the display 610 is touch-sensitive, a portion or all of the keypad 608 can be presented by way of the display 610 with navigation features.

The display 610 can use touch screen technology to also serve as a user interface for detecting user input. As a touch screen display, the communication device 600 can be adapted to present a user interface having graphical user interface (GUI) elements that can be selected by a user with a touch of a finger. The display 610 can be equipped with capacitive, resistive or other forms of sensing technology to detect how much surface area of a user's finger has been placed on a portion of the touch screen display. This sensing information can be used to control the manipulation of the GUI elements or other functions of the user interface. The display 610 can be an integral part of the housing assembly of the communication device 600 or an independent device communicatively coupled thereto by a tethered wireline interface (such as a cable) or a wireless interface.

The UI 604 can also include an audio system 612 that utilizes audio technology for conveying low volume audio (such as audio heard in proximity of a human ear) and high-volume audio (such as speakerphone for hands free operation). The audio system 612 can further include a microphone for receiving audible signals of an end user. The audio system 612 can also be used for voice recognition applications. The UI 604 can further include an image sensor 613 such as a charged coupled device (CCD) camera for capturing still or moving images.

The power supply 614 can utilize common power management technologies such as replaceable and rechargeable batteries, supply regulation technologies, and/or charging system technologies for supplying energy to the components of the communication device 600 to facilitate long-range or short-range portable communications. Alternatively, or in combination, the charging system can utilize external power sources such as DC power supplied over a physical interface such as a USB port or other suitable tethering technologies.

The location receiver 616 can utilize location technology such as a global positioning system (GPS) receiver capable of assisted GPS for identifying a location of the communication device 600 based on signals generated by a constellation of GPS satellites, which can be used for facilitating location services such as navigation. The motion sensor 618 can utilize motion sensing technology such as an accelerometer, a gyroscope, or other suitable motion sensing technology to detect motion of the communication device 600 in three-dimensional space. The orientation sensor 620 can utilize orientation sensing technology such as a magnetometer to detect the orientation of the communication device 600 (north, south, west, and east, as well as combined orientations in degrees, minutes, or other suitable orientation metrics).

The communication device 600 can use the transceiver 602 to also determine a proximity to a cellular, Wi-Fi, Bluetooth®, or other wireless access points by sensing techniques such as utilizing a received signal strength indicator (RSSI) and/or signal time of arrival (TOA) or time of flight (TOF) measurements. The controller 606 can utilize computing technologies such as a microprocessor, a digital signal processor (DSP), programmable gate arrays, application specific integrated circuits, and/or a video processor with associated storage memory such as Flash, ROM, RAM, SRAM, DRAM or other storage technologies for executing computer instructions, controlling, and processing data supplied by the aforementioned components of the communication device 600.

Other components not shown in FIG. 6 can be used in one or more embodiments of the subject disclosure. For instance, the communication device 600 can include a slot for adding or removing an identity module such as a Subscriber Identity Module (SIM) card or Universal Integrated Circuit Card (UICC). SIM or UICC cards can be used for identifying subscriber services, executing programs, storing subscriber data, and so on.

The terms "first," "second," "third," and so forth, as used in the claims, unless otherwise clear by context, is for clarity only and does not otherwise indicate or imply any order in time. For instance, "a first determination," "a second determination," and "a third determination," does not indicate or imply that the first determination is to be made before the second determination, or vice versa, etc.

In the subject specification, terms such as "store," "storage," "data store," data storage," "database," and substantially any other information storage component relevant to operation and functionality of a component, refer to "memory components," or entities embodied in a "memory" or components comprising the memory. It will be appreciated that the memory components described herein can be either volatile memory or nonvolatile memory, or can comprise both volatile and nonvolatile memory, by way of illustration, and not limitation, volatile memory, non-volatile memory, disk storage, and memory storage. Further, nonvolatile memory can be included in read only memory (ROM), programmable ROM (PROM), electrically programmable ROM (EPROM), electrically erasable ROM (EEPROM), or flash memory. Volatile memory can comprise random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM). Additionally, the disclosed memory components of systems or methods herein are intended to comprise, without being limited to comprising, these and any other suitable types of memory.

Moreover, it will be noted that the disclosed subject matter can be practiced with other computer system configurations, comprising single-processor or multiprocessor computer systems, mini-computing devices, mainframe computers, as well as personal computers, hand-held computing devices (e.g., PDA, phone, smartphone, watch, tablet computers, netbook computers, etc.), microprocessor-based or programmable consumer or industrial electronics, and the like. The illustrated aspects can also be practiced in distributed computing environments where tasks are performed by remote processing devices that are linked through a communications network; however, some if not all aspects of the subject disclosure can be practiced on stand-alone computers. In a distributed computing environment, program modules can be located in both local and remote memory storage devices.

In one or more embodiments, information regarding use of services can be generated including services being accessed, media consumption history, user preferences, and so forth. This information can be obtained by various methods including user input, detecting types of communications (e.g., video content vs. audio content), analysis of content streams, sampling, and so forth. The generating, obtaining and/or monitoring of this information can be responsive to an authorization provided by the user. In one or more embodiments, an analysis of data can be subject to authorization from user(s) associated with the data, such as an opt-in, an opt-out, acknowledgement requirements, notifications, selective authorization based on types of data, and so forth.

Some of the embodiments described herein can also employ artificial intelligence (AI) to facilitate automating one or more features described herein. The embodiments (e.g., in connection with automatically identifying acquired cell sites that provide a maximum value/benefit after addition to an existing communication network) can employ various AI-based schemes for conducting various embodiments thereof. Moreover, the classifier can be employed to determine a ranking or priority of each cell site of the acquired network. A classifier is a function that maps an input attribute vector, $x=(x_1, x_2, x_3, x_4 \ldots x_n)$, to a confidence that the input belongs to a class, that is, $f(x) =$confidence (class). Such classification can employ a probabilistic and/or statistical-based analysis (e.g., factoring into the analysis utilities and costs) to determine or infer an action that a user desires to be automatically performed. A support vector machine (SVM) is an example of a classifier that can be employed. The SVM operates by finding a hypersurface in the space of possible inputs, which the hypersurface attempts to split the triggering criteria from the non-triggering events. Intuitively, this makes the classification correct for testing data that is near, but not identical to training data. Other directed and undirected model classification approaches comprise, e.g., naïve Bayes, Bayesian networks, decision trees, neural networks, fuzzy logic models, and probabilistic classification models providing different patterns of independence can be employed. Classification as used herein also is inclusive of statistical regression that is utilized to develop models of priority.

As will be readily appreciated, one or more of the embodiments can employ classifiers that are explicitly trained (e.g., via a generic training data) as well as implicitly trained (e.g., via a observing UE behavior, operator preferences, historical information, receiving extrinsic information). For example, SVMs can be configured via a learning or training phase within a classifier constructor and feature selection module. Thus, the classifier(s) can be used to automatically learn and perform a number of functions, including but not limited to determining according to predetermined criteria which of the acquired cell sites will benefit a maximum number of subscribers and/or which of the acquired cell sites will add minimum value to the existing communication network coverage, etc.

As used in some contexts in this application, in some embodiments, the terms "component," "system" and the like are intended to refer to, or comprise, a computer-related entity or an entity related to an operational apparatus with one or more specific functionalities, wherein the entity can be either hardware, a combination of hardware and software, software, or software in execution. As an example, a component may be, but is not limited to being, a process running on a processor, a processor, an object, an executable, a thread of execution, computer-executable instructions, a program, and/or a computer. By way of illustration and not limitation, both an application running on a server and the server can be a component. One or more components may reside within a process and/or thread of execution and a component may be localized on one computer and/or distributed between two or more computers. In addition, these components can execute from various computer readable media having various data structures stored thereon. The components may communicate via local and/or remote processes such as in accordance with a signal having one or more data packets (e.g., data from one component interacting with another component in a local system, distributed system, and/or across a network such as the Internet with other systems via the signal). As another example, a component can be an apparatus with specific functionality provided by mechanical parts operated by electric or electronic circuitry, which is operated by a software or firmware application executed by a processor, wherein the processor can be internal or external to the apparatus and executes at least a part of the software or firmware application. As yet another example, a component can be an apparatus that provides specific functionality through electronic components without mechanical parts, the electronic components can comprise a processor therein to execute software or firmware that confers at least in part the functionality of the electronic components. While various components have been illustrated as separate components, it will be appreciated that multiple components can be implemented as a single component, or a single component can be implemented as multiple components, without departing from example embodiments.

Further, the various embodiments can be implemented as a method, apparatus or article of manufacture using standard programming and/or engineering techniques to produce software, firmware, hardware or any combination thereof to control a computer to implement the disclosed subject matter. The term "article of manufacture" as used herein is intended to encompass a computer program accessible from any computer-readable device or computer-readable storage/communications media. For example, computer readable storage media can include, but are not limited to, magnetic storage devices (e.g., hard disk, floppy disk, magnetic strips), optical disks (e.g., compact disk (CD), digital versatile disk (DVD)), smart cards, and flash memory devices (e.g., card, stick, key drive). Of course, those skilled in the art will recognize many modifications can be made to this configuration without departing from the scope or spirit of the various embodiments.

In addition, the words "example" and "exemplary" are used herein to mean serving as an instance or illustration. Any embodiment or design described herein as "example" or "exemplary" is not necessarily to be construed as preferred or advantageous over other embodiments or designs. Rather, use of the word example or exemplary is intended to present concepts in a concrete fashion. As used in this application, the term "or" is intended to mean an inclusive "or" rather than an exclusive "or." That is, unless specified otherwise or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

Moreover, terms such as "user equipment," "mobile station," "mobile," subscriber station," "access terminal," "terminal," "handset," "mobile device" (and/or terms representing similar terminology) can refer to a wireless device utilized by a subscriber or user of a wireless communication service to receive or convey data, control, voice, video, sound, gaming or substantially any data-stream or signaling-stream. The foregoing terms are utilized interchangeably herein and with reference to the related drawings.

Furthermore, the terms "user," "subscriber," "customer," "consumer" and the like are employed interchangeably throughout, unless context warrants particular distinctions among the terms. It should be appreciated that such terms can refer to human entities or automated components supported through artificial intelligence (e.g., a capacity to make inference based, at least, on complex mathematical formalisms), which can provide simulated vision, sound recognition and so forth.

As employed herein, the term "processor" can refer to substantially any computing processing unit or device comprising, but not limited to comprising, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit (ASIC), a digital signal processor (DSP), a field programmable gate array (FPGA), a programmable logic controller (PLC), a complex programmable logic device (CPLD), a discrete gate or transistor logic, discrete hardware components or any combination thereof designed to perform the functions described herein. Processors can exploit nano-scale architectures such as, but not limited to, molecular and quantum-dot based transistors, switches and gates, in order to optimize space usage or enhance performance of user equipment. A processor can also be implemented as a combination of computing processing units.

As used herein, terms such as "data storage," data storage," "database," and substantially any other information storage component relevant to operation and functionality of a component, refer to "memory components," or entities embodied in a "memory" or components comprising the memory. It will be appreciated that the memory components or computer-readable storage media, described herein can be either volatile memory or nonvolatile memory or can include both volatile and nonvolatile memory.

What has been described above includes mere examples of various embodiments. It is, of course, not possible to describe every conceivable combination of components or methodologies for purposes of describing these examples, but one of ordinary skill in the art can recognize that many further combinations and permutations of the present embodiments are possible. Accordingly, the embodiments disclosed and/or claimed herein are intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

In addition, a flow diagram may include a "start" and/or "continue" indication. The "start" and "continue" indications reflect that the steps presented can optionally be incorporated in or otherwise used in conjunction with other routines. In this context, "start" indicates the beginning of the first step presented and may be preceded by other activities not specifically shown. Further, the "continue" indication reflects that the steps presented may be performed multiple times and/or may be succeeded by other activities not specifically shown. Further, while a flow diagram indicates a particular ordering of steps, other orderings are likewise possible provided that the principles of causality are maintained.

As may also be used herein, the term(s) "operably coupled to," "coupled to," and/or "coupling" includes direct coupling between items and/or indirect coupling between items via one or more intervening items. Such items and intervening items include, but are not limited to, junctions, communication paths, components, circuit elements, circuits, functional blocks, and/or devices. As an example of indirect coupling, a signal conveyed from a first item to a second item may be modified by one or more intervening items by modifying the form, nature or format of information in a signal, while one or more elements of the information in the signal are nevertheless conveyed in a manner than can be recognized by the second item. In a further example of indirect coupling, an action in a first item can cause a reaction on the second item, as a result of actions and/or reactions in one or more intervening items.

Although specific embodiments have been illustrated and described herein, it should be appreciated that any arrangement which achieves the same or similar purpose may be substituted for the embodiments described or shown by the subject disclosure. The subject disclosure is intended to cover any and all adaptations or variations of various embodiments. Combinations of the above embodiments, and other embodiments not specifically described herein, can be used in the subject disclosure. For instance, one or more features from one or more embodiments can be combined with one or more features of one or more other embodiments. In one or more embodiments, features that are positively recited can also be negatively recited and excluded from the embodiment with or without replacement by another structural and/or functional feature. The steps or functions described with respect to the embodiments of the subject disclosure can be performed in any order. The steps or functions described with respect to the embodiments of the subject disclosure can be performed alone or in combination with other steps or functions of the subject disclosure, as well as from other embodiments or from other steps that have not been described in the subject disclosure. Further, more than or less than all of the features described with respect to an embodiment can also be utilized.

What is claimed is:

1. A device, comprising:
a processing system including a processor; and
a memory that stores executable instructions that, when executed by the processing system, facilitate performance of operations, the operations comprising:
allocating a port for receiving a request to access a resource of a second device, wherein the second device has a non-routable network address, wherein the device is on a first network, wherein the second device is on a third network, and wherein the first network and the third network are communicatively coupled by a second network;
opening a second connection to a network element on the second network responsive to receiving a first connection;
sending a first message to the network element to create a meeting with the resource; and
sending a Geocast message requesting that the second device create a third connection that enables access to the resource, wherein the Geocast message identifies a geographic area in which the second device is physically located,
wherein the network element forwards an encrypted version of the Geocast message to the second device, and wherein the second device decrypts the encrypted version of the Geocast message and, responsive to the Geocast message, establishes the third connection to the network element.

2. The device of claim 1, wherein a body of the Geocast message includes a field containing a Geocast ID of an intended target device.

3. The device of claim 2, wherein the first connection is received from a third device, and wherein the first connection, the second connection and the third connection form a user datagram protocol stream between the second device and the third device.

4. The device of claim 2, wherein the first connection is received from a third device, and wherein the first connection, the second connection and the third connection form a transmission control protocol stream between the second device and the third device.

5. The device of claim 4, wherein the device and the third device are one device, and wherein the port is a local port.

6. The device of claim 5, wherein the second network is an Internet.

7. The device of claim 6, wherein the first message is encrypted with a first half of a first asymmetric key pair, and wherein the network element possesses a second half of the first asymmetric key pair with which a network element decrypts the first message.

8. The device of claim 7, wherein the Geocast message is encrypted by a first half of a second asymmetric key pair denoting privilege to access the resource of the second device, and wherein the second device possesses a second half of the second asymmetric key pair with which the second device decrypts the Geocast message.

9. The device of claim 8, wherein messages passed over the transmission control protocol stream are secured by the third device and the second device encrypting the messages using a symmetric key pair.

10. The device of claim 1, wherein the network element is a server.

11. The device of claim 1, wherein the network element is a virtual network function.

12. The device of claim 1, wherein the processing system comprises a plurality of processors operating in a distributed computing environment.

13. A non-transitory, machine-readable medium, comprising executable instructions that, when executed by a processing system including a processor, facilitate performance of operations, the operations comprising:
establishing a first connection with a first device on a first network;
receiving a request from the first device to access a resource of a second device having a non-routable Internet Protocol (IP) address, wherein the processing system is on the first network, wherein the second device is on a third network isolated from a second network by a firewall, and wherein the first network and the third network are communicatively coupled by the second network;
opening a second connection to a network element on the second network responsive to receiving the request;
sending a first message to the network element requesting access the resource; and
sending a Geocast message over the second connection requesting that the second device create a third connection, wherein the Geocast message identifies a geographic area in which the second device is physically located,
wherein the network element forwards an encrypted version of the Geocast message to the second device, and wherein the second device decrypts the encrypted version of the Geocast message and, responsive to the Geocast message, establishes the third connection.

14. The non-transitory, machine-readable medium of claim 13, wherein a body of the Geocast message includes a field containing a Geocast ID of an intended target device.

15. The non-transitory, machine-readable medium of claim 14, wherein the first connection, the second connection and the third connection form a transmission control protocol stream between the second device and the first device.

16. The non-transitory, machine-readable medium of claim 15, wherein messages passed over the transmission control protocol stream are secured by the first device and the second device by encrypting the messages using a symmetric key pair.

17. The non-transitory, machine-readable medium of claim 16, wherein the first message is encrypted with a first half of a first asymmetric key pair, and wherein the network element possesses a second half of the first asymmetric key pair with which a network element decrypts the first message.

18. The non-transitory, machine-readable medium of claim 17, wherein the Geocast message is encrypted by a first half of a second asymmetric key pair denoting privilege to access the resource of the second device, and wherein the second device possesses a second half of the second asymmetric key pair with which the second device decrypts the Geocast message.

19. The non-transitory, machine-readable medium of claim 18, wherein the second network is an Internet.

20. A method, comprising:
receiving, by a processing system including a processor, a request over a first connection with a first device on a first network to access a resource of a mobile device having a non-routable Internet Protocol (IP) address on a third network, wherein the first network is isolated from a second network by a first firewall, wherein the third network isolated from the second network by a second firewall, and wherein the first network and the third network are communicatively coupled by the second network;

opening, by the processing system, a second connection to a network element on the second network responsive to receiving the request;

sending, by the processing system, a first message to the network element requesting access the resource; and encrypting and sending, by the processing system, a Geocast message over the second connection identifying a geographic area in which the mobile device is physically located, wherein the network element forwards the Geocast message to the mobile device, wherein the mobile device decrypts the Geocast message and, responsive to the Geocast message, establishes a third connection to the network element, and wherein the first connection, the second connection and the third connection form a transmission control protocol stream between the mobile device and the first device.

* * * * *